(12) United States Patent
Toye et al.

(10) Patent No.: US 7,195,256 B2
(45) Date of Patent: Mar. 27, 2007

(54) VEHICLE FOR GROUND COVER ROLLS

(75) Inventors: Jonathan Dallas Toye, Auckland (NZ); Malcolm Keith Baker, Hastings (NZ)

(73) Assignee: Doranda Limited, Auckland (NZ)

( * ) Notice: Subject to any disclaimer, the term of this patent is extended or adjusted under 35 U.S.C. 154(b) by 20 days.

(21) Appl. No.: 10/834,311

(22) Filed: Aug. 19, 2004

(65) Prior Publication Data
US 2005/0191146 A1 Sep. 1, 2005

(30) Foreign Application Priority Data
Mar. 1, 2004 (NZ) .................................... 531447

(51) Int. Cl.
*B60P 7/08* (2006.01)
(52) U.S. Cl. ..................... 280/79.6; 410/48; 410/42; 242/598.3; 242/599.3; 414/910
(58) Field of Classification Search ................ 410/42, 410/47, 48; 414/908, 910, 911; 280/79.11, 280/79.6; 242/388.6, 390, 576.1, 403, 594.3, 242/590, 598.3, 598, 599.2, 599.3
See application file for complete search history.

(56) References Cited

U.S. PATENT DOCUMENTS 3,990,650 A * 11/1976 Devine
4,649,954 A * 3/1987 Dunwoody

* cited by examiner

*Primary Examiner*—Stephen Gordon
(74) *Attorney, Agent, or Firm*—Hovey Williams LLP

(57) ABSTRACT

A vehicle for transporting, rolling and unrolling ground covers broadly includes an elongate framework, a spindle supported by the framework to mount one or more rolls of material, one or more ground wheels, and split bearings located toward the ends of the framework for receiving and supporting the roll-carrying spindles. The split bearings each include an upper part which is openable to enable the split bearing to receive and secure the end of the spindle. Preferably, the framework includes one or more parts, such as support members, which are operable to pivot about the framework so that the angle of the axis of the spindle is adjustable.

6 Claims, 12 Drawing Sheets

VEHICLE FOR GROUND COVER ROLLS

FIELD OF THE INVENTION

The present invention relates to a vehicle for transporting, rolling and unrolling ground covers.

BACKGROUND TO THE INVENTION

One approach to promoting plant growth and development is to place ground covers over the ground adjacent or near to a plant. Use of such covers gives a number of benefits including conserving soil moisture, controlling weed growth and reflecting light back upwards to the plant.

Generally, ground covers can be put down and removed at various times during the year. The ground covers can be used consecutively on several crops within a growing season and for reuse over a number of years. Usually this is done by hand and can take a long time, especially in large orchards.

The ground covers are commonly used within orchard blocks which generally comprise a number of crops, plants or trees growing in a number of successive rows. For such applications, the ground covers are generally installed between adjacent rows and are available in various lengths and widths to suit. The ground covers are typically stored in rolls and these are often difficult to handle, maneuver and transport about and between orchard blocks. The unrolling and rolling of the ground covers during installation and removal is typically time consuming and labour intensive.

It is an object of the present invention to provide an improved vehicle for transporting, rolling and unrolling ground covers, or to at least provide the public with a useful choice.

SUMMARY OF THE INVENTION

In one aspect, the present invention broadly consists in a vehicle configured to support and transport a roll or rolls of material and which is arranged so that the material can be rolled or unrolled including: an elongate framework; a spindle supported by the framework to mount the roll(s); one or more ground wheels; and split bearings located toward each end of the framework for receiving and supporting the spindle carrying the roll(s), wherein each split bearing includes an upper part which is openable to enable the split bearing to receive and secure an end of the spindle.

Preferably, the framework further includes a locking device associated with each split bearing which is operable to lock the bearing closed. More preferably, the locking device is an over-center lever which is also operable to open and close the upper part of the split bearing.

In another aspect, the present invention broadly consists in a vehicle configured to support and transport a roll or rolls of material and which is arranged so that the material can be rolled or unrolled including: an elongate framework; a spindle supported by the framework to mount the roll(s); and one or more ground wheels, wherein a part of the framework is telescopic so that the overall length of the vehicle in the longitudinal direction may be adjusted.

Preferably, the telescopic part of the framework is configured to receive and secure an end of the spindle. More preferably, the spindle is also telescopic so that its length may be adjusted, for example to suit different roll lengths and/or to suit the length of the telescopically adjustable framework.

In another aspect, the present invention broadly consists in a vehicle configured to support and transport a roll or rolls of material and which is arranged so that the material can be rolled or unrolled including: an elongate framework; a spindle supported by the framework to mount the roll(s); and one or more ground wheels, wherein one or more parts of the framework which support the spindle are operable to pivot about the framework so that the angle of the axis of the spindle may be adjusted.

Preferably, only one part of the framework supporting one end of the spindle is operable to pivot about the framework.

The following optional features may relate to each of the three broad aspects of the invention outlined above.

Preferably, the framework includes two upright end support members, each of which supports an end of the spindle. More preferably, either end support member may be moved toward or away from the other upright support member.

Preferably, the framework may also include one or more intermediate support members located between the end support members which are also configured to support the spindle. The position of the intermediate support members relative to the other support members may also be adjusted as desired.

Preferably, the spindle is powered and is operable to rotate either clockwise or anticlockwise to roll or unroll material onto or from the roll. More preferably, the spindle is powered by the shaft of a hydraulic motor mounted on the framework.

Preferably, the spindle may be arranged to mount one or more rolls.

BRIEF DESCRIPTION OF THE DRAWINGS

A preferred embodiment of the invention will be described by way of example only and with reference to the drawings, in which.

DETAILED DESCRIPTION OF PREFERRED EMBODIMENTS

Figure 1:
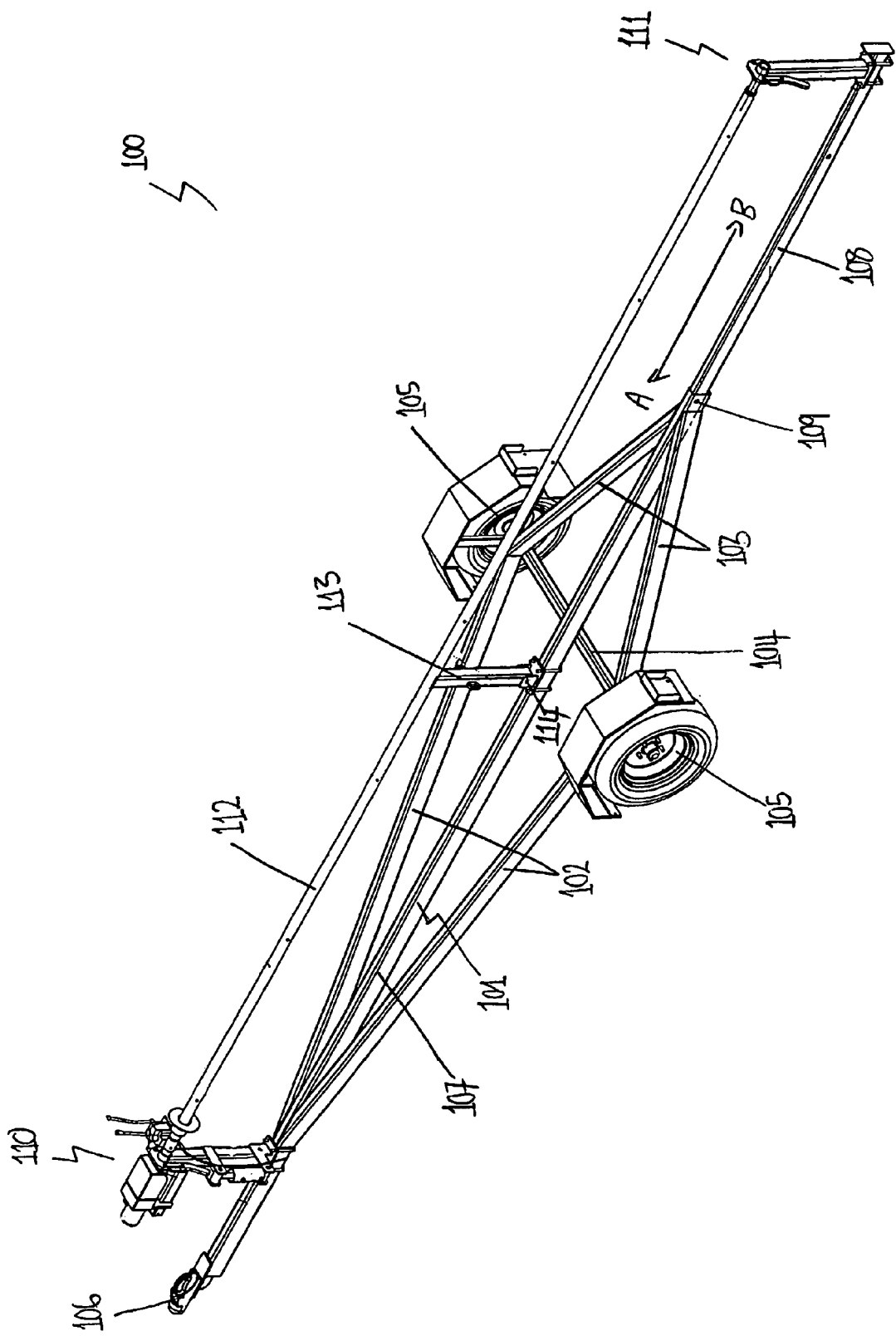
FIG. 1 shows a perspective view of the preferred vehicle in the form of a trailer, and in particular the framework, spindle and wheels of the trailer.

Referring to FIG. 1, a preferred embodiment vehicle is shown in the form of a trailer 100 which may be utilised to transport and handle rolls of ground covering in an agricultural application. For example, the trailer 100 may be used to transport rolls of ground covering to, from or between orchard blocks or between rows of crops or plants within orchard blocks as desired. The trailer 100 may also be utilised during the ground covering install and removal process as the ground covering may be rolled or unrolled directly from the trailer 100 by a powered means.

In the preferred form, the vehicle is a trailer 100 which may be towed, although it will be appreciated that the vehicle may be a truck, lorry, or other type of self-powered vehicle. The trailer 100 includes a framework which has a central support member, generally identified by 101, connected to front 102 and end 103 side support members. An axle 104 with ground wheels 105 at each end extends across the side 102, 103 and central 101 support members. An attachment or linkage 106 is provided toward the front end of the central support member 101 so that a tractor, quad bike, ATV, pickup, utility vehicle or the like can tow the trailer 100.

The central support member 101 is preferably telescopic so that its length can be adjusted as desired. In the preferred embodiment the central support member 101 includes front 107 and rear 108 parts, wherein the rear part 108 may slide back and forth within the front part 107 in a longitudinal direction, as shown by arrows AB, to alter the framework's and ultimately the trailer's overall length. A locking bolt or the like is provided at 109 to secure the front 107 and rear 108 parts together once the length adjustment is complete. The telescopic nature of the trailer 100 is desirable as the trailer's degree of manoeuvrability is generally determined and/or constrained by its overall length.

The trailer 100 includes a powered spindle 112 which mounts a roll (not shown) and which is supported at each end by upright front 110 and rear 111 end support members. In the preferred form the framework may also include an intermediate support member 113 located between the end 110, 111 support members which supports the spindle 112 in the middle. The intermediate support member 113 may pivot down about point 114 onto the central support member 101 so that it is out of the way when desired. In the preferred embodiment, each of the support members 110, 111, 112 is connected to the central support member 101 by two u-bolts and each may be moved along the length of the central support member 101 as desired.

Figure 2:
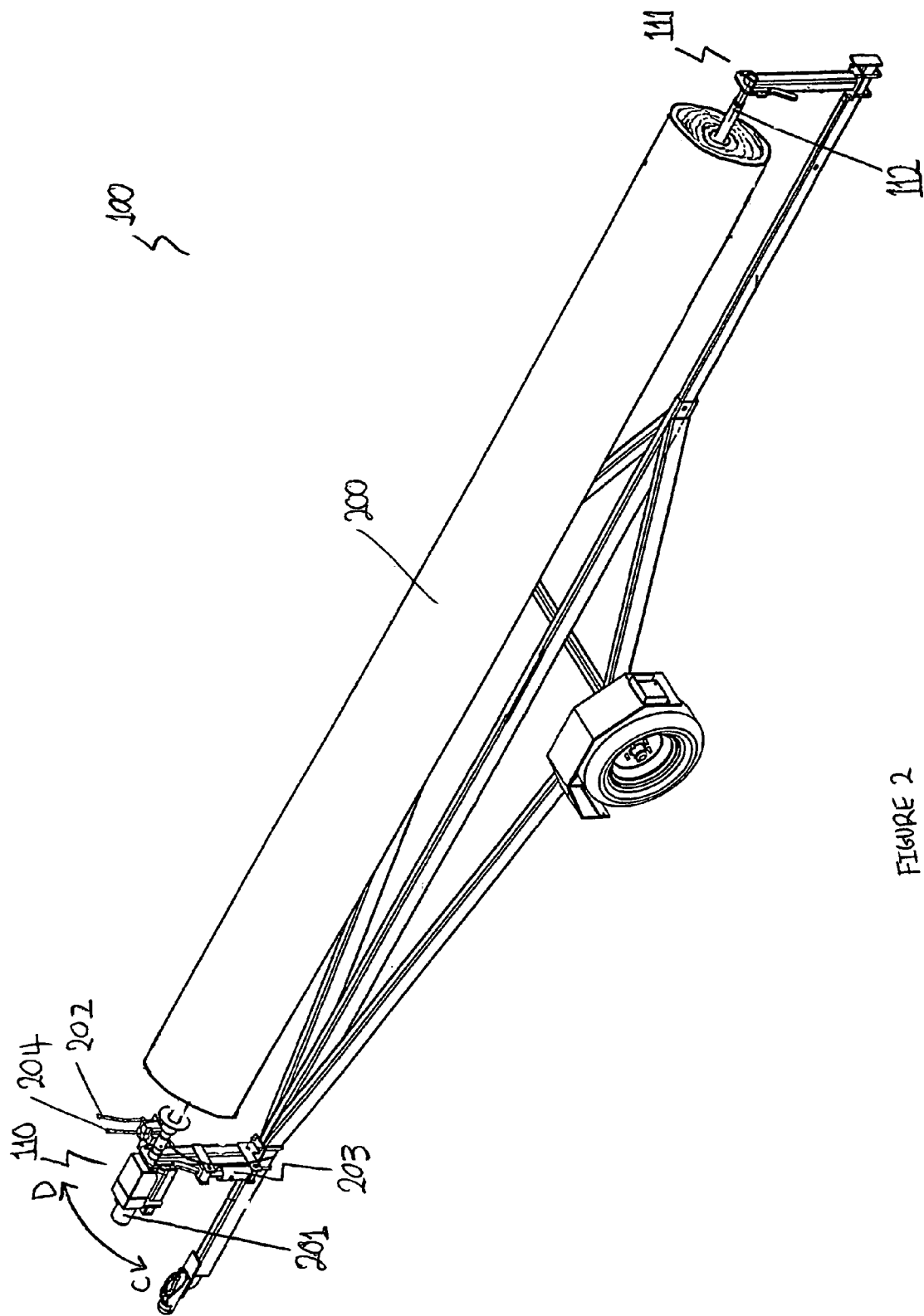
FIG. 2 shows a perspective view the trailer shown in FIG. 1 with a roll of ground covering mounted on the spindle, but without an intermediate support for the spindle.

Referring to FIG. 2, the trailer 100 is shown with a ground covering roll 200 mounted on the spindle 112. It will be noted that an intermediate spindle support is not utilised in this arrangement as the roll 200 extends substantially along the entire length of the spindle 112. It will be appreciated however that the spindle 112 may mount more than one roll and for such an arrangement may include one or more intermediate support members for the spindle 112 between each roll to provide additional strength.

The front 110 and rear 111 end support members are each provided with split bearings which may be opened to receive respective ends of the spindle 112 and locking devices to lock the split bearings closed to secure the spindle 112 to the framework. The split bearings and locking devices will be described in more detail later.

To load the trailer 100 with a roll 200 of ground covering, the roll 200 is firstly mounted onto and secured to the spindle 112 while the spindle 112 is removed from the framework. Typically, the roll 200 consists of ground covering wound onto a plastic cylindrical core (not shown), although it will be appreciated that a plastic core is not necessarily essential. The spindle 112 and mounted roll 200 may then be positioned above the open split bearings so that each end of the spindle 112 is aligned with its respective split bearing by a forklift, crane, hoist, winch or the like. Following this, the spindle 112 and mounted roll 200 may be lowered or dropped so that each split bearing receives an end of the spindle 112. With the spindle 112 and roll 200 now supported, the split bearings may be closed and locked to secure the spindle 112 and roll 200 to the framework.

The trailer 100, with mounted roll 200, may then be towed to the desired location where the ground covering is to be installed. On arriving at the location, the trailer 100 can be manoeuvred into position so that the roll 200 of ground covering is aligned with the stretch of ground which is to be covered, for example the roll 200 may be positioned at the end of two adjacent rows of crops, plants, trees or vines. With the trailer 100 in place, the ground covering may be unrolled as required. To aid in this process, the front end support 110 includes a hydraulic motor 201 with a rotatable shaft which may be coupled to the spindle 112. The hydraulic motor 201 is operable by a lever 202 to cause the spindle 112 to rotate either clockwise or anticlockwise as desired to roll or unroll the ground covering. The speed at which the spindle 112 rotates may also be controlled as desired by the lever 202. It will also be appreciated that the spindle 112 may be allowed to free roll about its longitudinal axis by disconnecting the spindle 112 from the shaft of the hydraulic motor 201. In such a configuration, the roll 200 may be unrolled by a user pulling an end of the ground covering away from the trailer 100 by hand or by a machine, tractor, quad bike, ATV, pickup, utility vehicle or the like.

When it comes time to remove the ground covering from the ground, a plastic cylindrical core which the ground covering is to be wound onto is firstly mounted onto the spindle 112. The trailer 100 may then be aligned with the ground covering, which can be attached to the plastic core and then rolled onto it by the hydraulic motor 201 which rotates the spindle 112. The roll, consisting of the wound ground covering and the plastic core, may then be removed from the spindle 112, and a new plastic core may be mounted onto the spindle 112 to roll another length of ground covering if desired.

As an alternative option, ground coverings may be directly rolled onto and unrolled from the spindle 112 without the use of a plastic core. Therefore, spindles with rolled coverings may be mounted onto or removed from the trailer 100 as required.

During the rolling process, the ground covering may skew to one side of the spindle 112 if the rolled covering already on the spindle 112 is not perfectly aligned with the covering about to be rolled onto it, which is a common problem when rolling any type of sheet material. To address this, the trailer is designed so that a user may adjust the angle of the axis of the spindle 112 during the rolling process to enable the ground cover to be evenly rolled. More specifically, the front end support member 110 is pivotable about the framework, for example in the arc indicated by arrows CD. This enables the end of the spindle 112 secured to the front end support 110 to move about a corresponding arc CD, while the opposite end of the spindle remains stationary in the rigid end support member 111, thereby enabling adjustment of the angle of the axis of the spindle 112. The pivotable movement of the front end support member 110 is powered by a hydraulic cylinder and ram arrangement 203 which is operable by a lever 204. The hydraulic arrangement will be described in more detail later.

Figure 3:
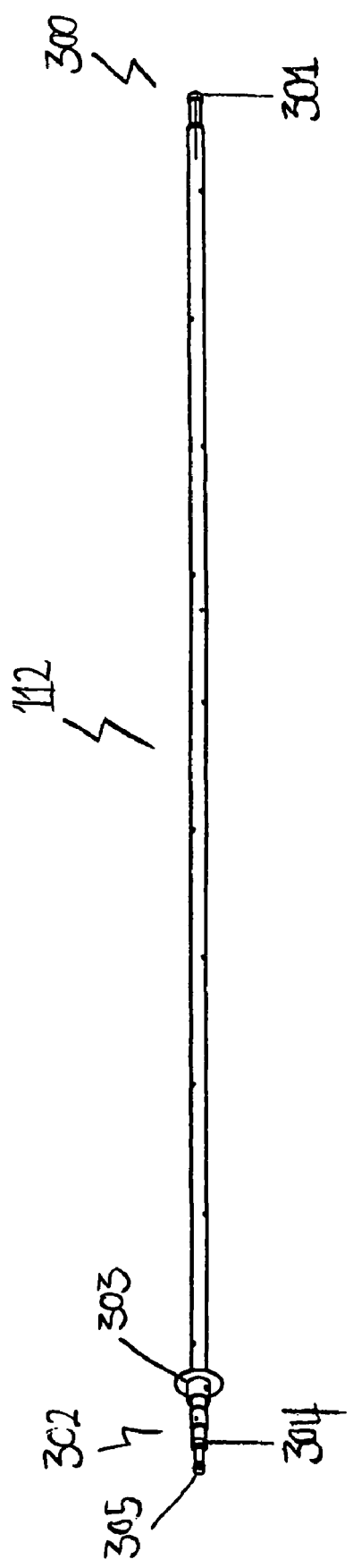
FIG. 3 shows a perspective view of the spindle of the trailer.
Figure 4:
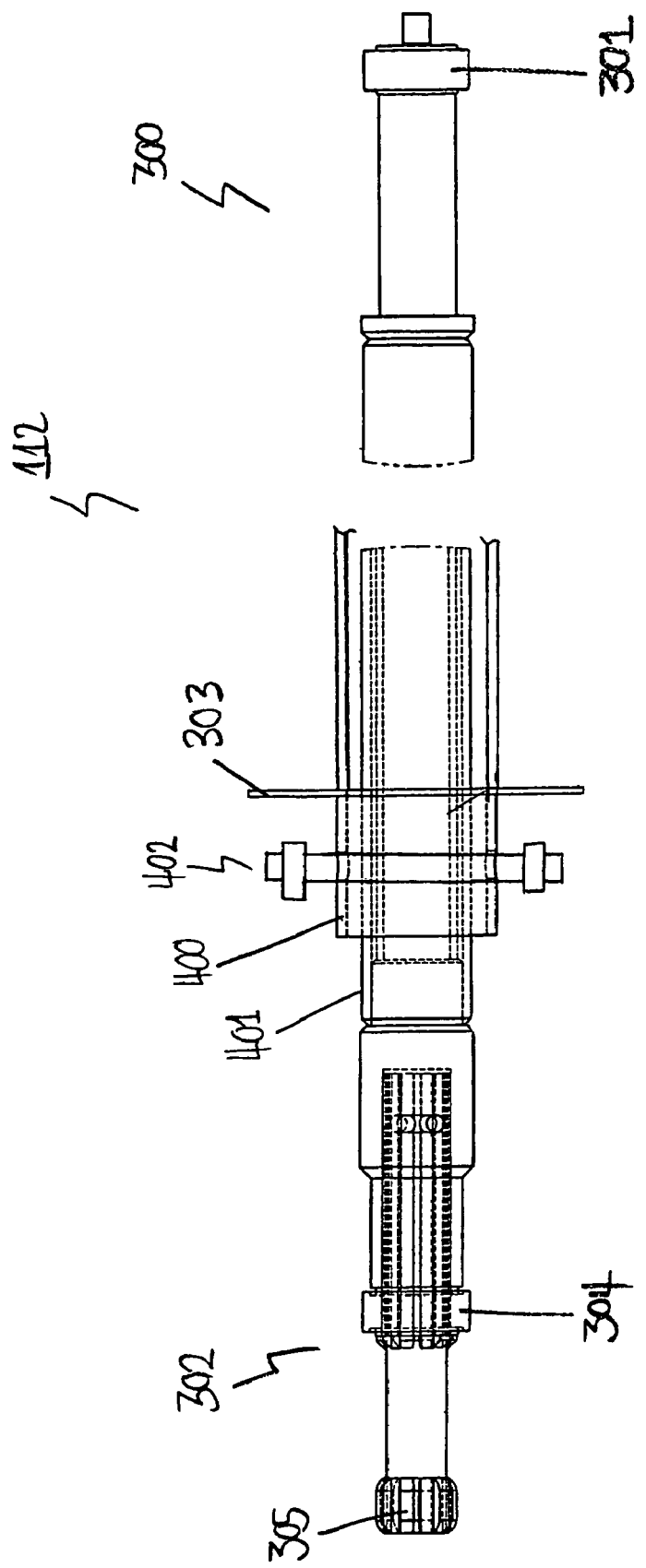
FIG. 4 shows detailed side views of the front and rear end parts of the spindle.

Referring to FIGS. 3 and 4, the end 300 of the spindle 112 which is securable in the split bearing of the rear end support (not shown) includes a bearing portion 301 which enables complementary engagement of the end 300 of the spindle 112 within the split bearing. The opposite end 302 of the spindle 112 includes a number of annular components including an annular flange 303 which enables the core of a roll of ground covering to be fastened to the spindle 112 and prevents the roll from sliding along the spindle 112 during transport, rolling or unrolling. It will be appreciated that the other end 300 may also be provided with an annular flange type stopper to prevent sliding of the roll. In a possible form of the spindle, two slidable stoppers may be provided at each end of the spindle 112 to prevent the roll, or more specifically the core of the roll, sliding along the spindle 112.

The end part 302 of the spindle 112 also includes a bearing portion 304 to enable complementary engagement of the end 302 of the spindle 112 within the split bearing of the front end support member. Further, an annular coupling portion 305 is provided to engage with a coupling component (not shown), to be explained in more detail later, which couples the spindle 112 to the shaft of the hydraulic motor to enable powered rotation of the spindle 112.

Referring to FIG. 4 only, a portion of the plastic cylindrical core 400 of a roll is shown mounted on the central shaft 401 of the spindle 112. In the preferred embodiment, the plastic core 400 is secured to the central shaft 401 by a locking bolt and nut arrangement 402 which extends through aligned apertures in the central shaft 401 and plastic core 400. It will be appreciated that the plastic core 400 may be secured in such a manner to the central shaft 401 at more than one location along the spindle 112, for example a locking bolt and nut arrangement may be positioned at each end of the plastic core 400. Furthermore, it will be appreciated that the central shaft 401 of the spindle 112 may have a number of apertures along its length through which the locking bolt may engage to enable rolls to be secured at different positions along the spindle's 112 length, or to suit different roll lengths.

Figure 5:
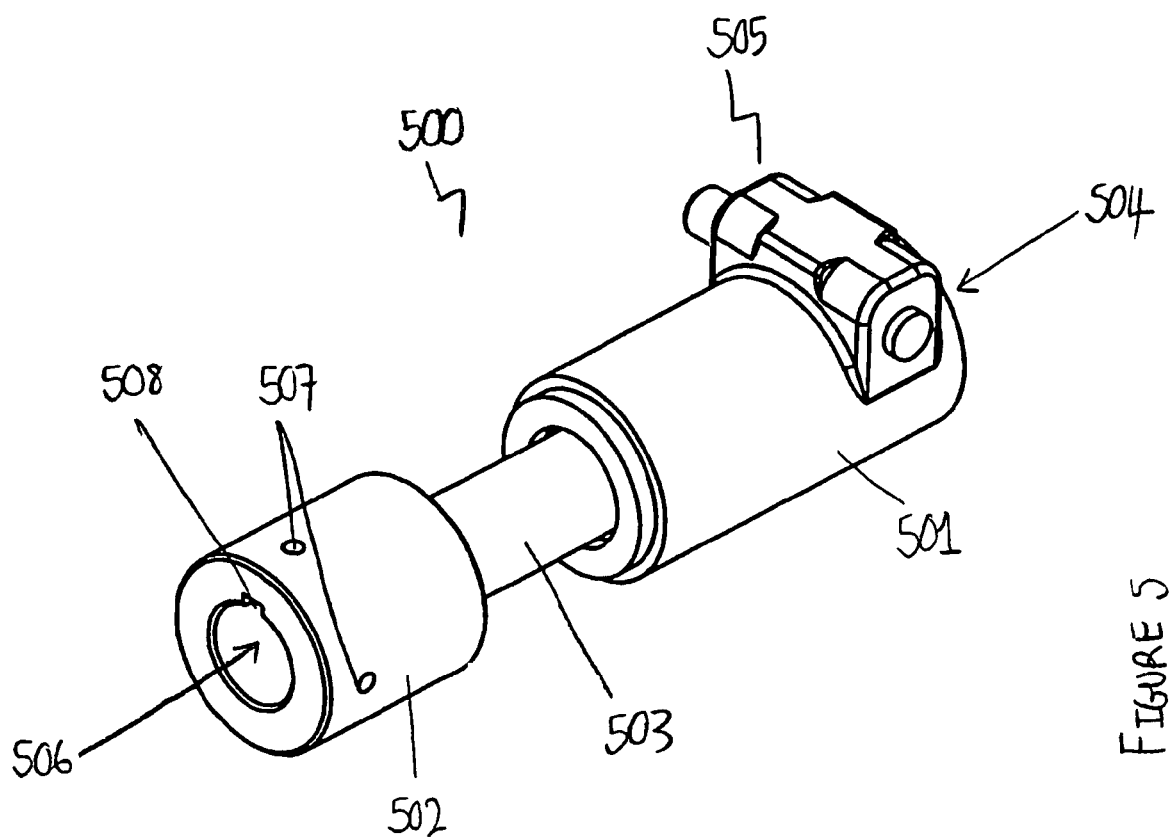
FIG. 5 shows a perspective view of a coupling component which couples an end of the spindle to a shaft of a hydraulic motor.
Figure 6:
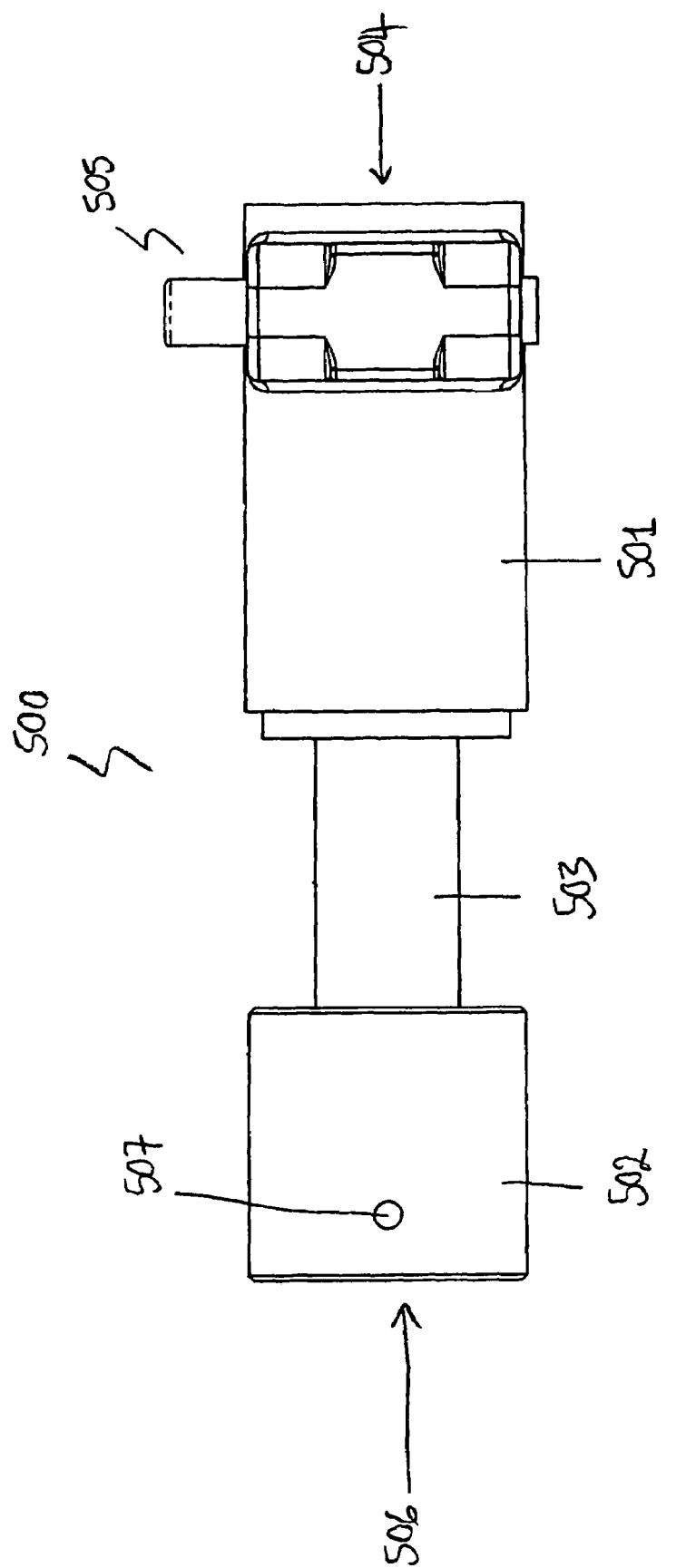
FIG. 6 shows a side view of the coupling component shown in FIG. 5.

Referring to FIGS. 5 and 6, the coupling component 500, which couples an end of the spindle 112 to the shaft of the hydraulic motor, includes front 501 and rear 502 annular parts connected together by a connecting rod 503 of reduced diameter relative to the front 501 and rear 502 parts. The front part 501 includes an aperture (not visible) identified by 504 which an end part of the spindle 112 engages with, for example the annular coupling portion 305 shown in FIGS. 3 and 4. The end of the spindle 112 may be secured within or released from the aperture of the front part 501 by actuation of a locking pin arrangement 505. The rear part 502 of the coupling component 500 also includes an aperture 506 which the shaft of the hydraulic motor may engage with. The rear part 502 includes apertures 507 which screws, pins, bolts or the like may extend into to clamp the shaft of the hydraulic motor within the rear part 502. Further, an elongate recessed portion 508 is provided within the wall of the aperture 506 which may engage with a complementary raised elongate ridge on the shaft of the hydraulic motor to reduce slipping of the shaft within the coupling component 500.

Figure 7:
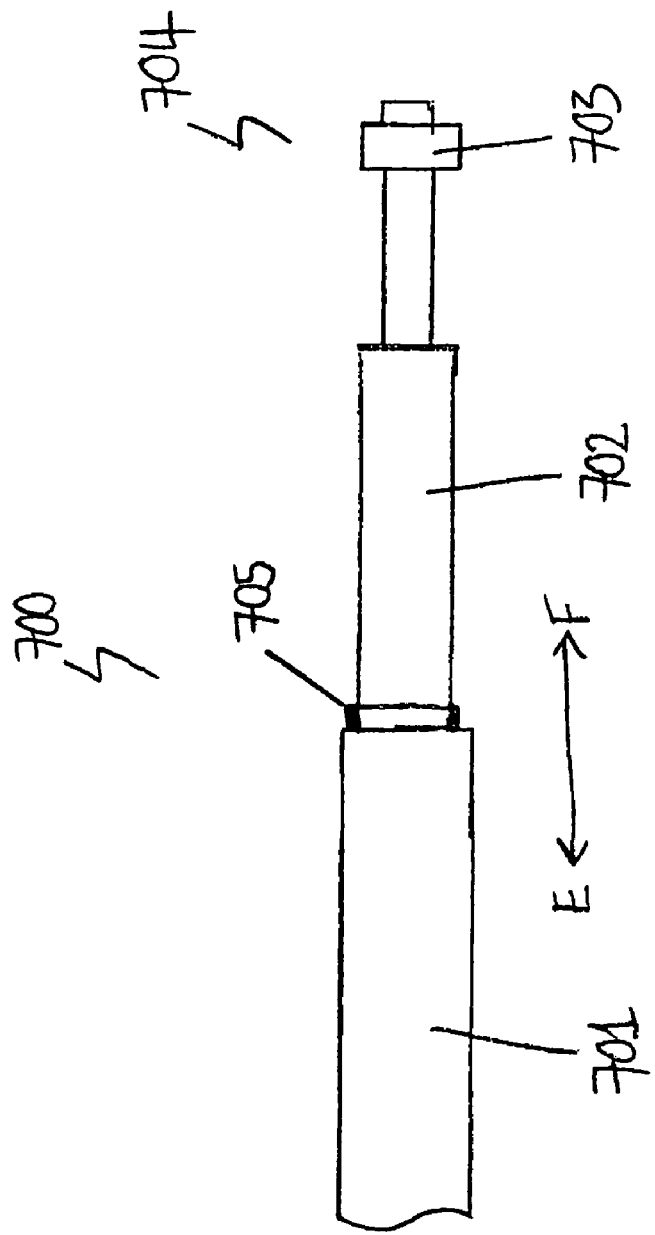
FIG. 7 shows an end portion of an alternative form of spindle with telescoping capability.

Referring to FIG. 7, an alternative form of spindle 700 which has telescoping capability to enable the length of the spindle 700 to be adjusted as required may be utilised with the trailer. As shown, by way of example only, the central shaft of the spindle 700 may comprise two parts, an outer shaft 701 and an inner shaft 702 which is slidable within the outer shaft 701 in either direction indicated by arrows E and F. As with the non-telescopic spindle 112 previously described, a bearing portion 703 is provided at the end 704 of the inner shaft 702 to enable complementary engagement of the end 704 of the spindle 700 within a split bearing of an end support member of the trailer. A locking device 705, such as a pin, bolt, screw or the like, is also provided toward the end of the outer shaft 701 which is operable to secure the inner shaft 702 within the outer shaft 701 once the length of the spindle 700 has been adjusted as required. Other telescopic locking arrangements may also be utilised to bind the two shafts 701, 702 together, such as interference fit, taper lock, and twist lock arrangements. It will be appreciated that various other telescoping spindle arrangements could be utilised also, for example the spindle may comprise more than one telescoping part.

Figure 8:
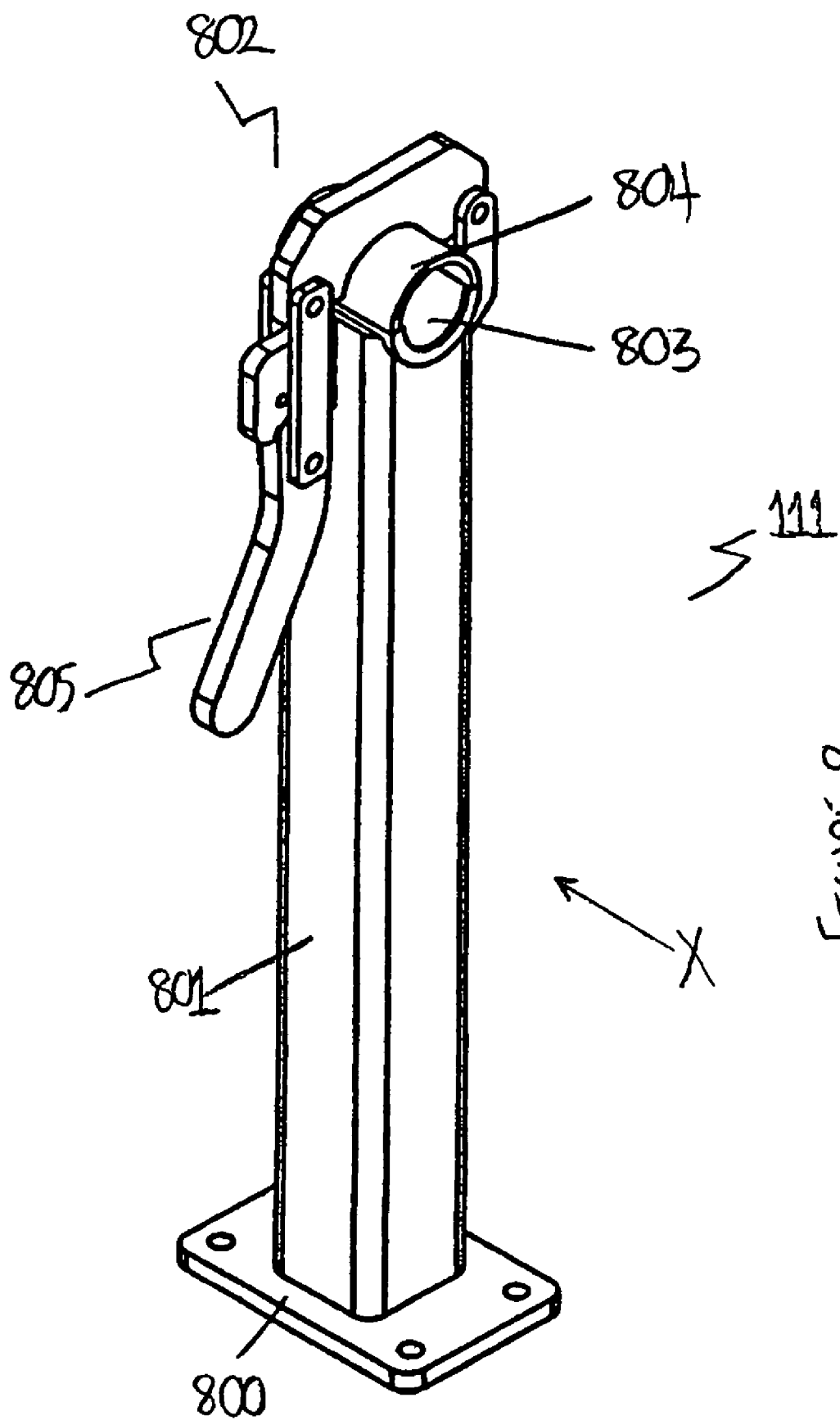
FIG. 8 shows a perspective view of a rear end spindle support of the framework, and in particular a split bearing and locking device.

Referring to FIG. 8, the rear end support 111 includes a base plate 800 which an upright member 801 extends from. The split bearing 802 is located at the top of the upright member 801 and includes lower 803 and upper 804 parts, both of which are semicylindrical. In the preferred embodiment, the lower part 803 is integrated with the top end of the upright support 801, while the upper part 804 is integrated with a part of a locking device which is operable by an over-center lever 805 to open, close and lock the split bearing as desired.

Figure 9:
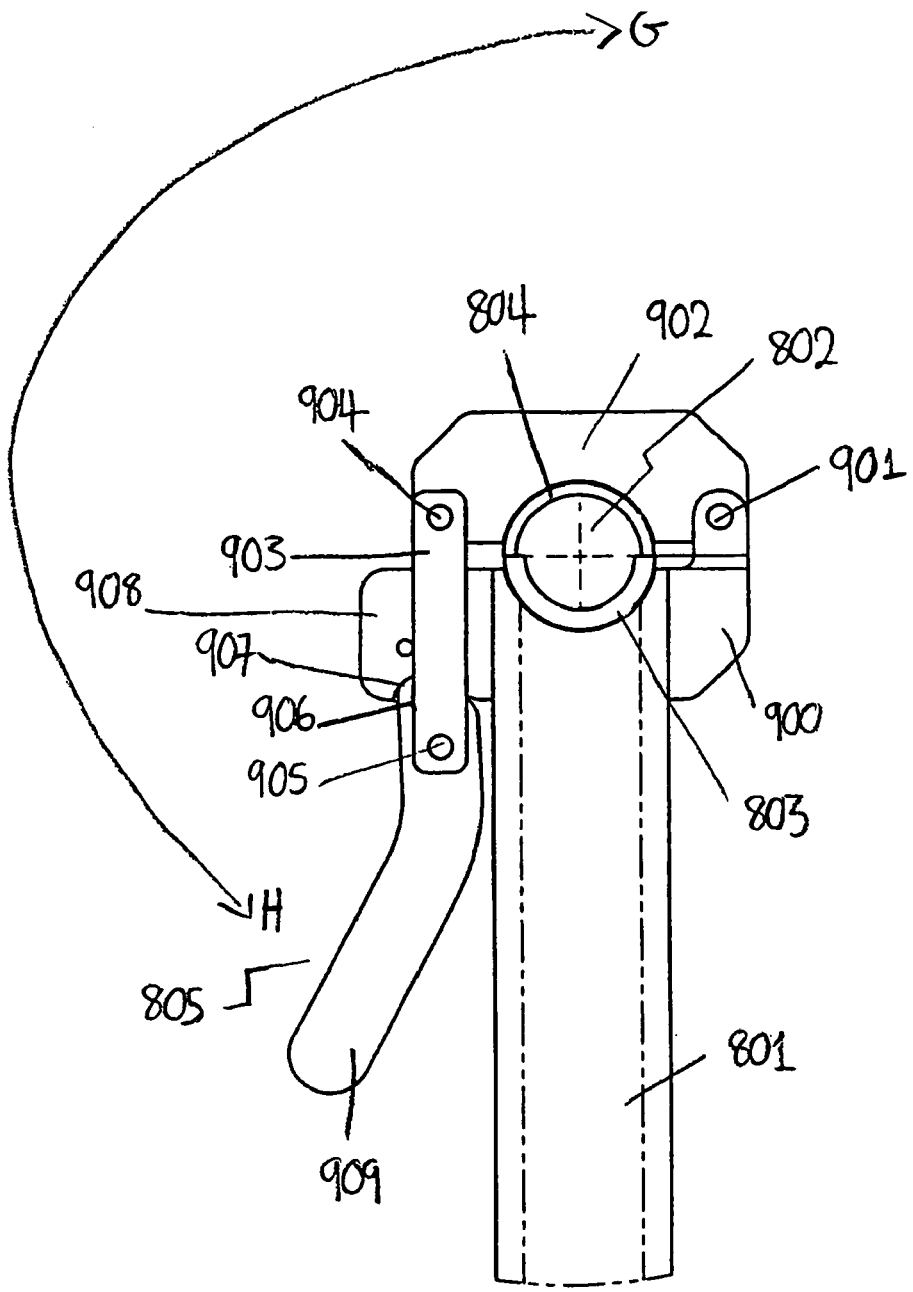
FIG. 9 shows an end view of the split bearing and locking device of the rear end spindle support from direction X in FIG. 8.

Referring to FIG. 9, the locking device includes two rear adjacent support members 900 (only one visible) which protrude from the upright support 801 and a locking member 902 and end of which is pivotably connected between the rear support members 900 at point 901. The locking member 902 forms the upper part 804 of the split bearing 802 and is pivotably connected at the other end between the ends of two parallel elongate members 903 (only one visible) at point 904. The opposite ends of the elongate members 903 are pivotably connected at point 905 to the shaped forward end 906 of the over-center lever 805 which is operable to open, close and lock the split bearing 802.

For example, the locking device is shown in a locked position with the split bearing closed 802. In the locked position, the forward end 906 of the lever 805 is securely engaged with a locking recess surface 907 of a forward support member 908 which extends from the upright support 801 between the elongate members 903 in the locked position. To unlock and open the split bearing 802 the handle part 909 of the lever 805 may be pulled and then pushed with sufficient force through the direction of arrow G. To close and relock the split bearing 802, for example, after an end of the spindle has been positioned in the lower part 803 of the split bearing 802, the handle part 909 of the lever 805 may be pulled and then pushed back through the direction indicated by arrow H so that the lever 805 locks as before.

Figure 10:
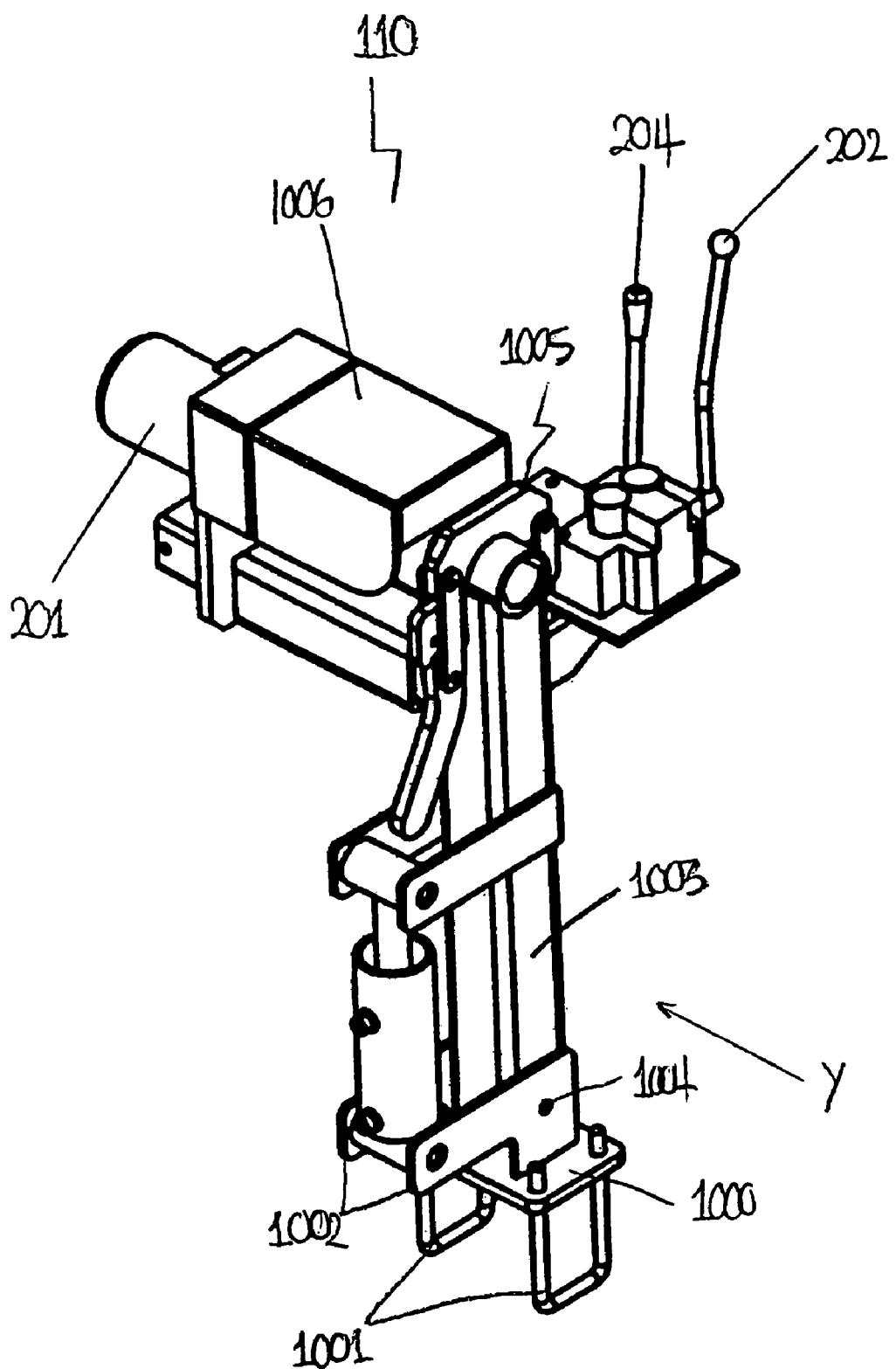
FIG. 10 shows a perspective view of a front end spindle support of the framework, and in particular a split bearing, locking device, and hydraulics.

Referring to FIG. 10, the front end support member 110 also includes a base plate 1000 which receives two u-bolts 1001 to facilitate connection of the support member 110 to the central support column 101 of the framework. Extending up from the base plate 1000 are two substantially flat L-shaped plates 1002 between which the lower end of an upright member 1003 is pivotally connected above the base plate 1000 at point 1004. The top end of the upright member 1003 includes the same split bearing and locking device arrangement generally identified by 1005 as was described earlier for the rear end support. The hydraulic motor 201 and its operating lever 202 are also mounted near the top of the upright member 1003. A protective cover 1006 is also provided which surrounds the shaft of the hydraulic motor, an end part of the spindle (not shown), and the coupling component which connects the shaft to the spindle.

Figure 11:
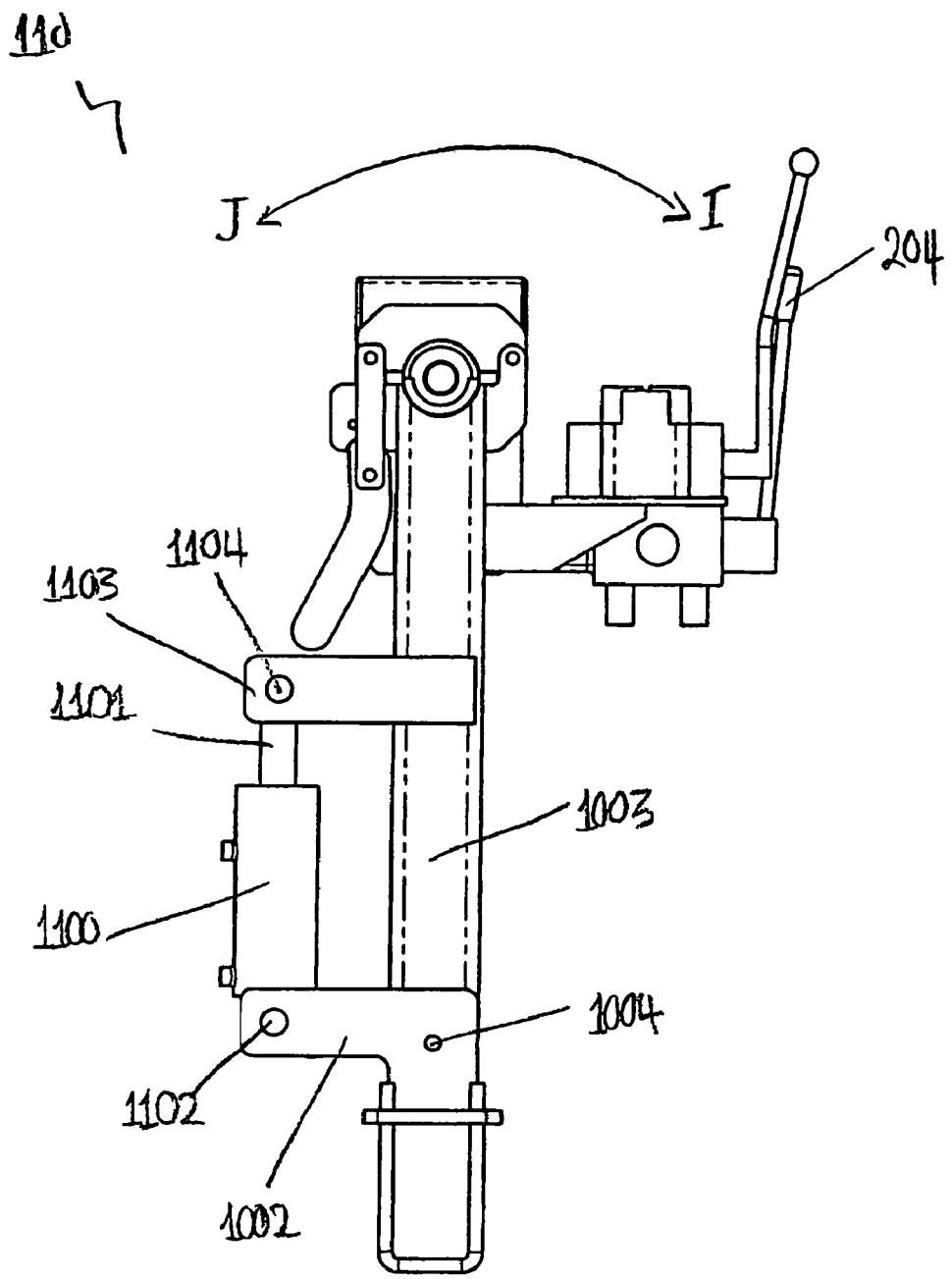
FIG. 11 shows an end view of the front end spindle support from direction Y in FIG. 10.

As previously mentioned, the front support member 110 is pivotable about the framework to enable the angle of the axis of the spindle to be adjusted during the rolling process to prevent the roll of ground covering from skewing. Referring to FIG. 11, this pivoting motion is effected by a hydraulic cylinder 1100 and ram 1101 arrangement that is mounted to the side of the upright support 1003. In particular, the lower end of the hydraulic cylinder 1100 is pivotally mounted between the ends of the L-shaped plates 1002 at point 1102 while the operating end of the hydraulic ram 1101 is pivotably coupled between two the ends of two elongate plates 1103 (only one visible) at point 1104. The other ends of the elongate plates 1103 are rigidly connected to opposite sides of the upright member 1003.

In operation, the hydraulic cylinder 1100 may be pressurised or depressurised to extend or retract the ram 1101 from or into the hydraulic cylinder 1100 via operation of the controlling lever 204. If the ram 1101 is operated to extend, then the upright support 1003 and all that is mounted on it pivots in direction I, but if the ram 1101 is retracted the upright support 1003 pivots in direction J. If a spindle is secured to the trailer, and therefore an end of the spindle is located within the split bearing of the front end support 101, then any pivoting movement will change the angle of the axis of the spindle. As mentioned, lever 204 may be utilised during the rolling process to prevent the roll of ground covering from skewing.

It will be appreciated that in an alternative embodiment both the front 110 and rear 111 end supports of the trailer 100, and any intermediate supports, may be configured to pivot about the framework to alter the axis of the spindle 112 when rolling the ground cover to prevent skewing.

In the preferred form, the hydraulic motor 201 and cylinder 1100 of the front end support member 110 would be powered by the hydraulic output lines commonly available at the back of most tractors and the like. Alternatively, if the vehicle towing the trailer does not have hydraulic outputs then the trailer may be configured to include a self-powered hydraulic pump.

It will be appreciated that the trailer provides a number of advantages over current roll handling vehicles. For example, the split bearings at each end of the trailer which each support an end of the spindle enable the spindle with a mounted roll to be dropped into or raised from the trailer using a forklift, winch, crane, hoist or the like. This provides an advantage in that the process of loading or unloading a roll into other roll handling trailers is usually more labour intensive as a number of people are required to help manoeuvre the roll into the trailer's mountings.

The telescopic nature of the trailer's framework provides an advantage in that the length of the trailer may be adjusted as required for manoeuvrability. This aspect is important as the trailer may have to be positioned within spatially constrained areas. Furthermore, the trailer's length may be suitably adjusted for different roll lengths.

The trailer provides an advantage also during the rolling process in that the axis of the spindle may be adjusted to prevent the roll from skewing along the spindle or coning of the roll. This may provide a speed advantage in that the time consuming need to unroll and re-roll to correct skewing would be reduced.

Figure 12:
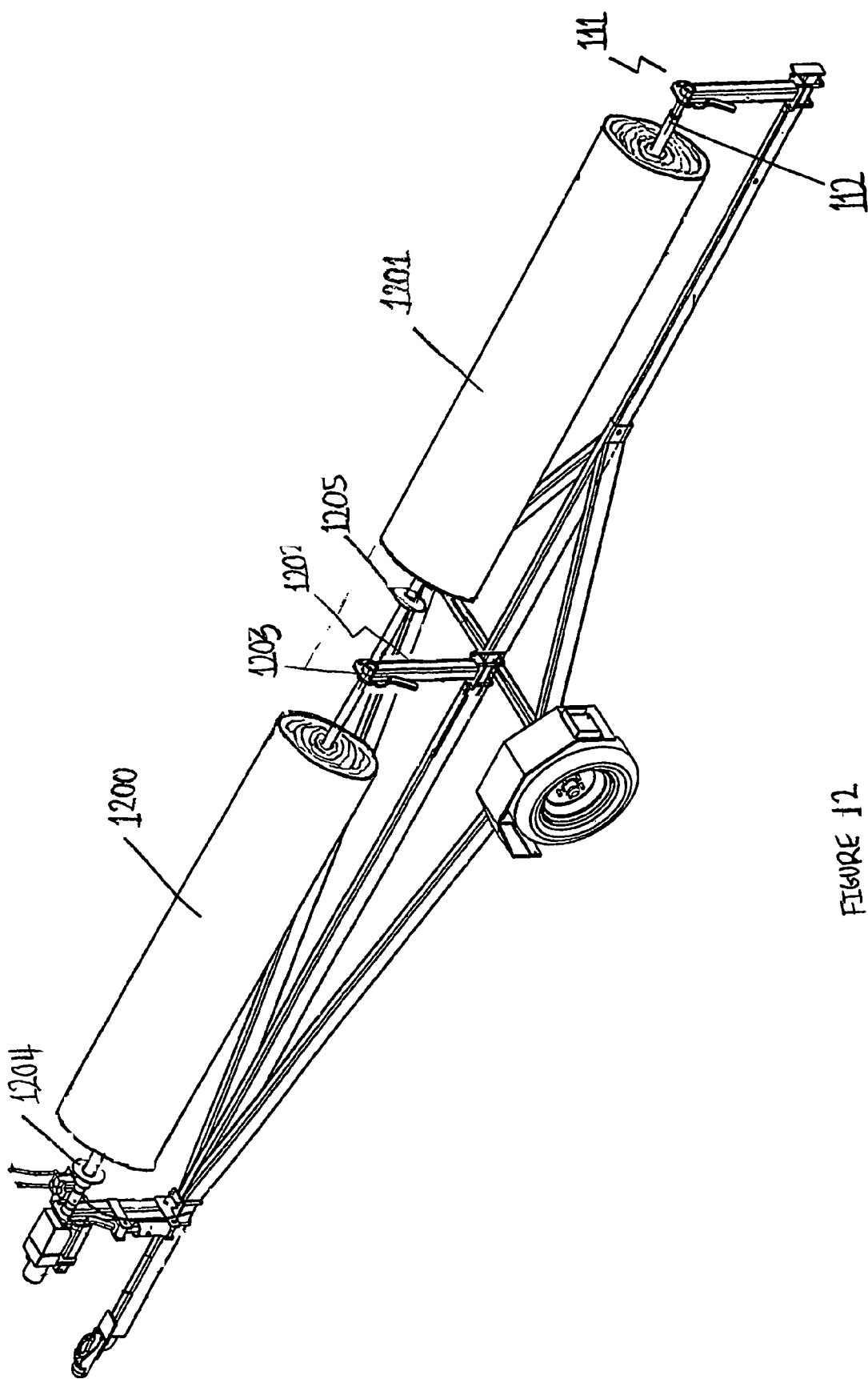
FIG. 12 shows a perspective view of the trailer shown in FIG. 1 with two rolls of ground covering mounted on the spindle and an additional lockable split bearing on the intermediate spindle support.

It will be appreciated that the trailer may be modified or scaled to suit particular requirements and that various alterations may be made to the trailer. For example, referring to FIG. 12, the spindle 112 may mount two separate rolls 1200, 1201. In this configuration an intermediate support 1202 to support the spindle 112 between each roll 1200, 1201 may be utilised to provide additional strength. Furthermore, the intermediate support 1202 may be of the same configuration as the rear end support 111 in that it includes a lockable split bearing 1203 which a middle part of the spindle 112 can be located and secured within. With this two-roll arrangement, two annular flanges 1204, 1205 would be provided on the spindle 112 to enable the plastic cores of each of the rolls 1200, 1201 to be fastened to the spindle 112. Such an arrangement allows two ground cover rolls 1200, 1201 to be rolled or unrolled simultaneously on one spindle.

It will be appreciated that more than two rolls could be mounted on the spindle also if required, and in such instances the trailer could be configured with additional intermediate supports as required. Furthermore, the trailer may be configured with more than one adjacent or parallel powered spindles with rolls so that ground covers could be rolled or unrolled from both sides of the trailer simultaneously to increase efficiency.

In alternative embodiments, the trailer components may be incorporated into a self-powered vehicle such as truck, lorry or the like. In a further alternative, the trailer components may be mounted on the side or cantilevered out from the back of a tractor, quad bike, ATV or the like via a conventional three-point linkage and therefore would not require wheels.

The foregoing description of the invention includes preferred forms thereof. Modifications may be made thereto without departing from the scope of the invention.

What is claimed is:

1. A vehicle that can transport, roll and unroll a roll or rolls of material comprising:

an elongate framework having opposing ends;

a spindle rotatably supported by the framework, the spindle having opposing ends between which one or more rolls of material may be carried;

one or more ground wheels that are arranged to support the framework above the ground; and split bearings provided at or toward each of the opposing ends of the framework that are arranged to support said opposing ends of the spindle, the split bearings each having an upper part that is moveable to enable the split bearing to be opened to receive an end of the spindle or to enable lifting of the spindle from the frame, the frame having a telescopically adjustable part that mounts one of the split bearings, the telescopically adjustable part being moveable to enable the length of the framework to be adjusted so that it can support spindles of different lengths.

2. A vehicle according to claim 1, wherein the framework further comprises locking devices associated with the split bearings, the locking devices being operable to lock the split bearings closed.

3. A vehicle according to claim 2, wherein the locking devices are over-center levers that are operable to open and close the upper parts of the split bearings.

4. A vehicle according to claim 1, wherein the spindle is powered and is operable to rotate either clockwise or anti-clockwise to roll or unroll material onto or from the roll or rolls of material which may be carried by the spindle.

5. A vehicle according to claim 1, wherein the frame comprises an elongate central support member having opposing ends and two upright supports, each upright support extending from one of to opposing ends of to central support member and being arranged to carry one of the split bearings.

6. A vehicle according to claim 1, to spindle having a length between its opposing ends, wherein to spindle is telescopic so that the length of to spindle may be adjusted.

* * * * *